(12) United States Patent
Wittsche

(10) Patent No.: US 10,989,237 B1
(45) Date of Patent: Apr. 27, 2021

(54) SYSTEM FOR EXTENDING THE HEIGHT OF CUBICLE WALL PANEL

(71) Applicant: Robert J. Wittsche, Weatherford, TX (US)

(72) Inventor: Robert J. Wittsche, Weatherford, TX (US)

(*) Notice: Subject to any disclaimer, the term of this patent is extended or adjusted under 35 U.S.C. 154(b) by 0 days.

(21) Appl. No.: 17/035,255

(22) Filed: Sep. 28, 2020

Related U.S. Application Data

(60) Provisional application No. 63/074,964, filed on Sep. 4, 2020.

(51) Int. Cl.
*F16B 2/22* (2006.01)
*E04B 2/74* (2006.01)

(52) U.S. Cl.
CPC . *F16B 2/22* (2013.01); *E04B 2/74* (2013.01)

(58) Field of Classification Search
CPC ...... F16B 2/22; F16B 2/20; E04B 2/74; E04B 1/40; E04F 11/1804
USPC ................ 52/27, 36.1, 38, 36.2; 248/231.41, 248/231.61, 231.71, 231.81, 288.6, 288.7
See application file for complete search history.

(56) References Cited

U.S. PATENT DOCUMENTS

| | | | |
|---|---|---|---|
| 1,999,741 A * | 4/1935 | Schultz | E04B 2/825 52/242 |
| 2,856,650 A * | 10/1958 | Hildebrand | B64C 1/1476 52/208 |
| 3,561,161 A | 2/1971 | Green | |
| 4,126,978 A | 11/1978 | Heller | |
| 4,559,738 A * | 12/1985 | Helfman | A47G 7/044 47/67 |
| 5,617,682 A * | 4/1997 | Christopher | E04D 13/0305 52/200 |
| 5,806,258 A | 9/1998 | Miedema et al. | |
| 5,822,918 A * | 10/1998 | Helfman | A47G 7/044 47/39 |
| 6,223,485 B1 | 5/2001 | Beck et al. | |
| 6,393,782 B1 | 5/2002 | Berridge et al. | |
| 6,533,019 B1 * | 3/2003 | King | E04B 2/7422 160/351 |
| 6,928,785 B2 | 8/2005 | Shipman et al. | |
| 7,051,482 B2 | 5/2006 | MacDonald et al. | |
| 7,117,802 B2 | 10/2006 | Hoke, Jr. et al. | |

(Continued)

FOREIGN PATENT DOCUMENTS

WO    WO 2001012913 A1    2/2001

*Primary Examiner* — Mark R Wendell
(74) *Attorney, Agent, or Firm* — Jeffrey G. Degenfelder; Carstens & Cahoon, LLP

(57) ABSTRACT

A system for extending the height of an existing cubicle wall is herein disclosed. The system comprises a top cap overlay fitted with a vertical extension panel. The cross-section of the top cap overlay is uniform and consistent along its length. The top cap overlay includes a lower channel extending along the length of the top cap overlay for mounting to the top of an existing cubicle wall. The top cap overlay also includes at least one upper channel or groove extending along the length of the top cap overlay for receiving a length of vertical extension panel. The upper channel or groove comprises at least two walls extending from the top of the horizontal panel and spaced sufficiently apart to receive and hold the thickness or width of the vertical extension panel. Further improvements for the system are disclosed, along with a method for using the system.

20 Claims, 10 Drawing Sheets

(56) References Cited

U.S. PATENT DOCUMENTS

| | | |
|---|---|---|
| 8,561,355 B2 | 10/2013 | Canavarro |
| 2004/0250480 A1* | 12/2004 | Matthai ................ E04B 2/7425 52/36.1 |
| 2012/0285103 A1* | 11/2012 | Canavarro ............ E04B 2/7416 52/27 |
| 2014/0014798 A1* | 1/2014 | Allen ....................... F16B 2/12 248/231.41 |
| 2017/0328127 A1* | 11/2017 | Stathis ................... A47B 43/00 |

* cited by examiner

US 10,989,237 B1

SYSTEM FOR EXTENDING THE HEIGHT OF CUBICLE WALL PANEL

CROSS-REFERENCE TO RELATED APPLICATION

This application claims the benefit of and priority to U.S. Provisional Patent Application No. 63/074,964 filed Sep. 4, 2020, the technical disclosure of which is hereby incorporated herein by reference.

BACKGROUND OF THE INVENTION

Technical Field

The present invention relates generally to space-dividing cubicle wall panel systems formed from upright wall panels and, more specifically, to a system for extending the height of cubicle wall panels in order to reduce the transmission of airborne droplets in a dense cubical environment.

Description of the Related Art

Cubicles, also known as cubicle desks, office cubicles or cubicle workstations, are ubiquitous in modern office design. Cubicles are commonly used to divide large, open office space into separate work spaces. Cubicles are a less expensive, more flexible alternative to office design and layout. A cubicle is a partially enclosed workspace, separated from adjacent workspaces by partitions or wall panels that are usually 4 to 8 feet tall. Its purpose is to separate office workers from the sights and noises of an open workspace, the theory being that this allows workers more privacy, and personalization, and helps them to concentrate without distractions. Horizontal work surfaces are usually suspended from the vertical walls of cubicles, as is shelving, overhead storage, and other amenities. Electrical and communications lines (i.e., telephone and internet) are often run through conduits configured within the cubicle walls, allowing each cubicle easy connection as would be the case in a traditional office space.

Cubicles are typically housed in a single large room, wherein the cubicles are used to compartmentalize that large room into individual work areas. Moreover, the cubicles can be readily reconfigured within the room to meet the changing needs of the office space. This is a distinguishing characteristic of cubicles over traditional office space design. which requires the erection of permanent walls to create individual offices. Traditional office design does not typically allow the work space to be readily reconfigured to accommodate the changes in the company needs, instead requiring very expensive demolition and relocation of permanent walls including all of the electrical and communication lines encased within those walls.

Existing cubicle walls come in a variety of vertical heights typically ranging from 4 to 8 feet tall. The wall panels typically include an internal, rectangular frame with a sheet of wall board or comparable material attached to the sides of the frame. Typically, the frame is made from roll-formed or extruded metal, with the wall board adhesively secured to the side of the metal frame members. Each side of the wall panel usually is covered with a fabric that is either bonded to the frame, or attached with an elastic band, so as to provide an aesthetically pleasing appearance to the user.

Once the cubicle walls are installed, then several attachments can be made to those walls including shelves, bookcases, filing cabinet and desks. Also once installed, any required electrical and communication lines may be routed through the cubicle wall conduits. However, while cubicles are a flexible alternative in reconfiguring the layout and design of an office space, there can be significant expense in disassembling and reconstructing the cubicles when certain configurations are desired.

One such accommodation is extending the height of the existing cubicle wall. For example, a work space may have initially been provisioned as a collaborative space requiring constant face time between peers such that lower 4 foot walls were appropriate. However, with the recent COVID-19 pandemic, the advantage of such concentrated work spaces does not conform to proper social distancing guidelines. Current cubicle design techniques and structural modification typically require that shorter walls be replaced with taller walls. This, in turn, requires that a significant portion of the cubicle be disassembled (walls and attached horizontal surfaces), the internal wiring removed, new taller walls installed, new internal wiring run and the horizontal surfaces reinstalled. Not only is this expensive in installation labor and materials (i.e., new cubicle walls), it is also highly disruptive requiring the cubicles be off-line for several hours, if not days.

Another structural system directed to these difficulties is disclosed in U.S. Pat. No. 8,561,355, which sets forth a system for extending the height of a cubicle wall comprising an adaptive, mechanical clamp attached to a wall panel and wall extender panel, wherein the adaptive mechanical clamp includes multiple screw and fixing elements for attaching the clamp to the wall panel and the wall extender panel. While an improvement over the prior art, the '355 system does not provide a sufficient air-tight seal between the existing panel and the wall extender panel. In addition, the wall extender panel is only supported by a single fixing element to the clamp. Moreover, the '355 reference does not disclose that the wall extender panel is sealed along its entire length against the top of the wall panel. Furthermore, the '355 reference only discloses extending a single panel on a single wall panel.

What is therefore needed is a system for quickly and inexpensively extending the height of vertical walls on a cubicle to reduce the transmission of airborne droplets between adjacent workspaces in a dense cubicle workspace environment.

SUMMARY OF THE INVENTION

The present invention overcomes many of the disadvantages of prior art systems and methods for extending the height of cubicle walls. The system is inexpensive and attractive, and does not require replacement of existing walls, nor the associated costs involved in breaking down and reassembly under current cubicle systems. Moreover, the system can be installed quickly with very little interruption to the occupants of the cubicles, keeping downtime to a minimum.

A system for extending the height of an existing cubicle wall is herein disclosed. The improved system includes a top cap overlay fitted with a vertically-configured extension panel. The cross-section of the top cap overlay is uniform and consistent along its length. The top cap overlay includes a lower channel extending along the length of the top cap overlay for mounting to an existing cubicle wall. The lower channel is formed by a horizontal panel having two walls extending from its bottom in a downward fashion from opposing ends of the horizontal panel. The two opposing walls may also include portions that are angled towards the center of the horizontal panel in order to provide a biasing element against the sides of the existing cubicle wall. The two opposing walls are used to secure the top cap overlay to the sides of the existing cubicle wall by counteracting and resisting any lateral force applied to the tope cap overlay or the vertical extension panel. The surface of the underside of the horizontal panel may include an abraded surface to prevent the movement of the top cap overlay along the top of the cubicle panel.

The top cap overlay also includes at least one upper channel or groove extending along the length of the top cap overlay for receiving a length of vertical extension panel. The upper channel or groove comprises at least two walls extending from the top of the horizontal panel and spaced sufficiently apart to receive and hold the thickness or width of the vertical extension panel. The at least two walls comprising the upper channel or groove may be angled towards each other to provide a bias against the sides of the vertical extension panel. In one embodiment, the at least one upper channel or groove may comprise two separate channels or grooves configured in a parallel alignment allowing for the placement of a sliding window panel in a first groove coupled with an opening in a long vertical extension panel in a second groove. While the vertical extension panel may comprise any material of suitable strength and rigidity, the vertical extension panel may preferably comprise an acrylic or polycarbonate sheet. In addition, the vertical extension panel may be clear, translucent, colored, opaque or textured.

While the top cap overlay may be constructed of a variety of materials, both composite and homogeneous, it is preferably constructed of an extruded high strength plastic material such as high-strength PVC. While the top cap overlay must be constructed of a strong and sufficiently rigid material, the material must also be sufficiently flexible to be able to flex without deformation or breakage. The exterior surface of the top cap overlay may also be textured and colored as desired. The top cap overlay is typically constructed in nominal lengths ranging from 1 to 12 feet long. However, custom lengths exceeding 12 feet are also contemplated. The top cap overlay is easily machined with conventional tooling further enhancing the ease of installation and quality of the finished extension wall.

BRIEF DESCRIPTION OF THE DRAWINGS

A more complete understanding of the method and apparatus of the present invention may be had by reference to the following detailed description when taken in conjunction with the accompanying drawings, wherein.

Figure 1:
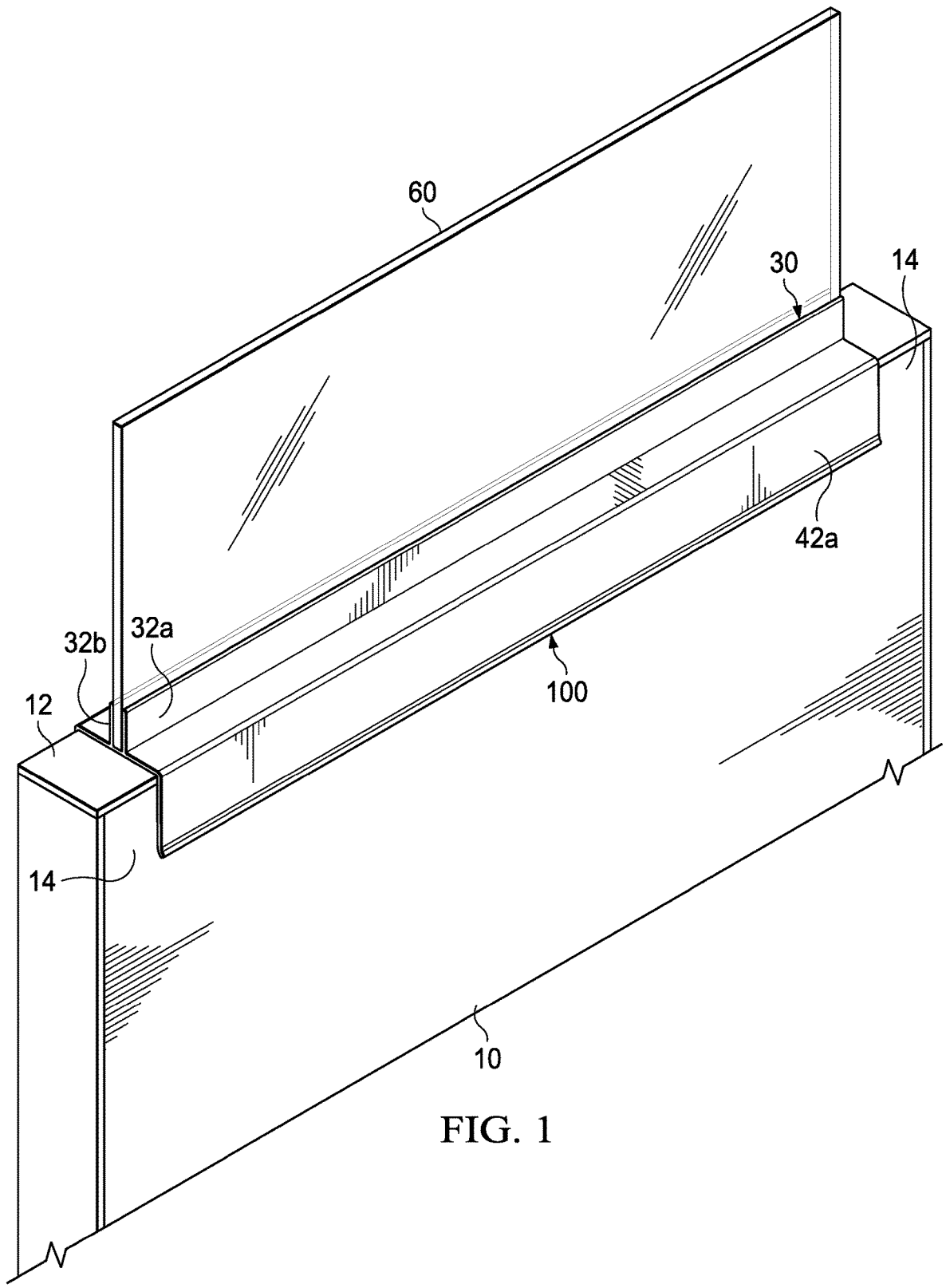
FIG. 1 is a perspective view of a length of the system of the present invention for extending the height of cubicle walls.
Figure 2:
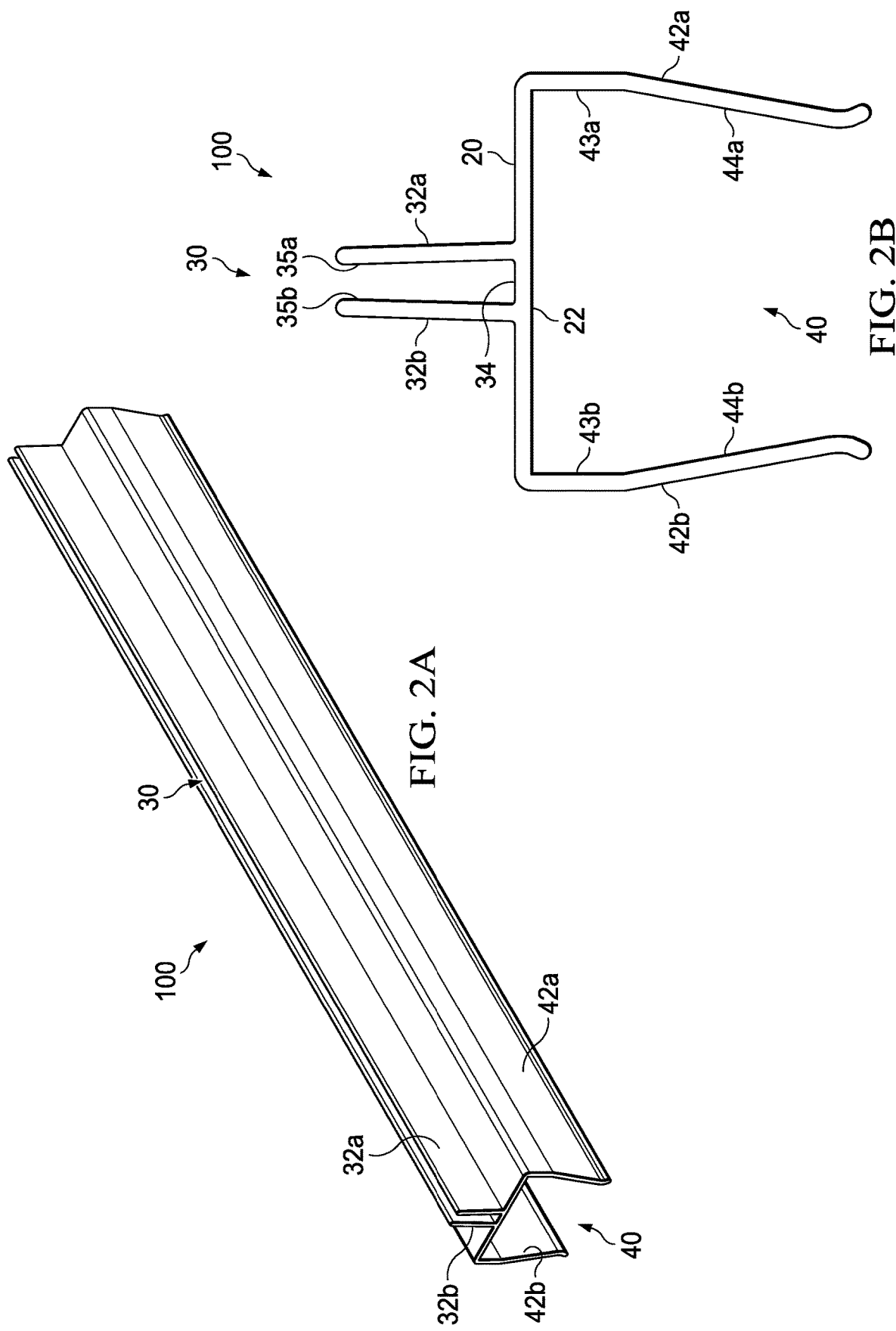
FIG. 2A is a perspective view of a length of the top cap overlay of the present invention.
FIG. 2B is a cross-sectional view thereof.

Where used in the various figures of the drawing, the same numerals designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

DETAILED DESCRIPTION OF THE INVENTION

An embodiment of the system of the present invention for extending the height of an existing cubicle wall is depicted in FIG. 1. The system comprises a top cap overlay 100 configured along the top of a cubicle wall panel 10. The top cap overlay 100 includes a lower channel having a horizontal panel section configured on the top surface 12 of the wall panel 10 and two vertical side walls 42 extending from opposing ends of the horizontal panel section. The two side walls 42 firmly grasp the sides 14 of the wall panel creating firm base for a length of vertically-configured extension panel 60 to be fitted in an upper groove or channel 30 extending from the top of the horizontal panel section of the top cap overlay 100. The upper channel or groove 30 includes at least two walls 32a, 32b extending from the top of the horizontal panel 20 and spaced sufficiently apart to receive and firmly hold the edge of the vertical extension panel 60 along its length. The at least two walls 32a, 32b forming the upper channel or groove 30 may be angled towards each other to provide a bias against the sides of the vertical extension panel 60. The height of the at least two walls 32a, 32b is designed to seal against and hold the vertical extension panel 60 snuggly and securely along its entire length. While the system of the present invention is suitable for extending the height of an existing cubicle wall permanently, the system is also suitable only temporary installation and may be readily removed or reconfigured without damage to the cubicle wall.

While the embodiment depicted in FIG. 1 only comprises a single length of top cap overlay 100 holding a similarly sized single length of vertically-configured extension panel 60 it is understood that multiple sections or lengths of top cap overlay 100 may be configured in series along an extended cubicle wall panel 10. The ends of the multiple sections may be adjoined to each other in a butt-joint fashion. In addition, while a vertically-configured extension panel may be joined to an adjacent extension panel in the same relative position as the butt joint between two adjacent top cap overlay sections, the butt joint between two adjacent top cap overlay sections may be offset from the joint between the two adjacent, vertically-configured extension panels. Moreover, a single section of vertically-configured extension panel may extend across one or more butt joints of adjacent top cap overlay sections.

With reference now to FIGS. 2A-4, an embodiment of the top cap overlay 100 of the present invention is depicted. The top cap overlay 100 may be constructed of a variety of materials including thermoplastics, metal and wood, and be both composite and homogeneous in construction. While the top cap overlay must be constructed of a strong and sufficiently rigid material, the material must also be sufficiently flexible to be able to flex without deformation or breakage. Nonetheless, the top cap overlay 100 is preferably constructed of an extruded high strength thermoplastic material such as polyvinyl chloride or PVC. For example, in one embodiment the top cap overlay 100 is constructed of extruded PVC having a wall thickness of 0.090 inches. The exterior surface of the top cap overlay may also be textured and colored as desired. The top cap overlay 100 is typically constructed in nominal lengths ranging from 1 to 12 feet long. However, custom lengths exceeding 12 feet are also contemplated.

The cross-section of the top cap overlay 100 (shown in FIG. 2B) is uniform and consistent along its length. The top cap overlay 100 includes a lower channel 40 extending along the entire length of the top cap overlay 100 for mounting to an existing cubicle wall. The lower channel 40 is formed by a horizontal panel 20 having two walls 42 extending from its bottom in a downward fashion from opposing ends of the horizontal panel 20. The two walls 42 of the lower channel 40 are designed to secure the top cap overlay 100 to the sides 14 (FIG. 3) of the existing cubical wall 10. The two opposing walls 42 are designed to counteract and resist any lateral force applied to the top cap overlay 100 or the vertical extension panel 60.

Figure 3:
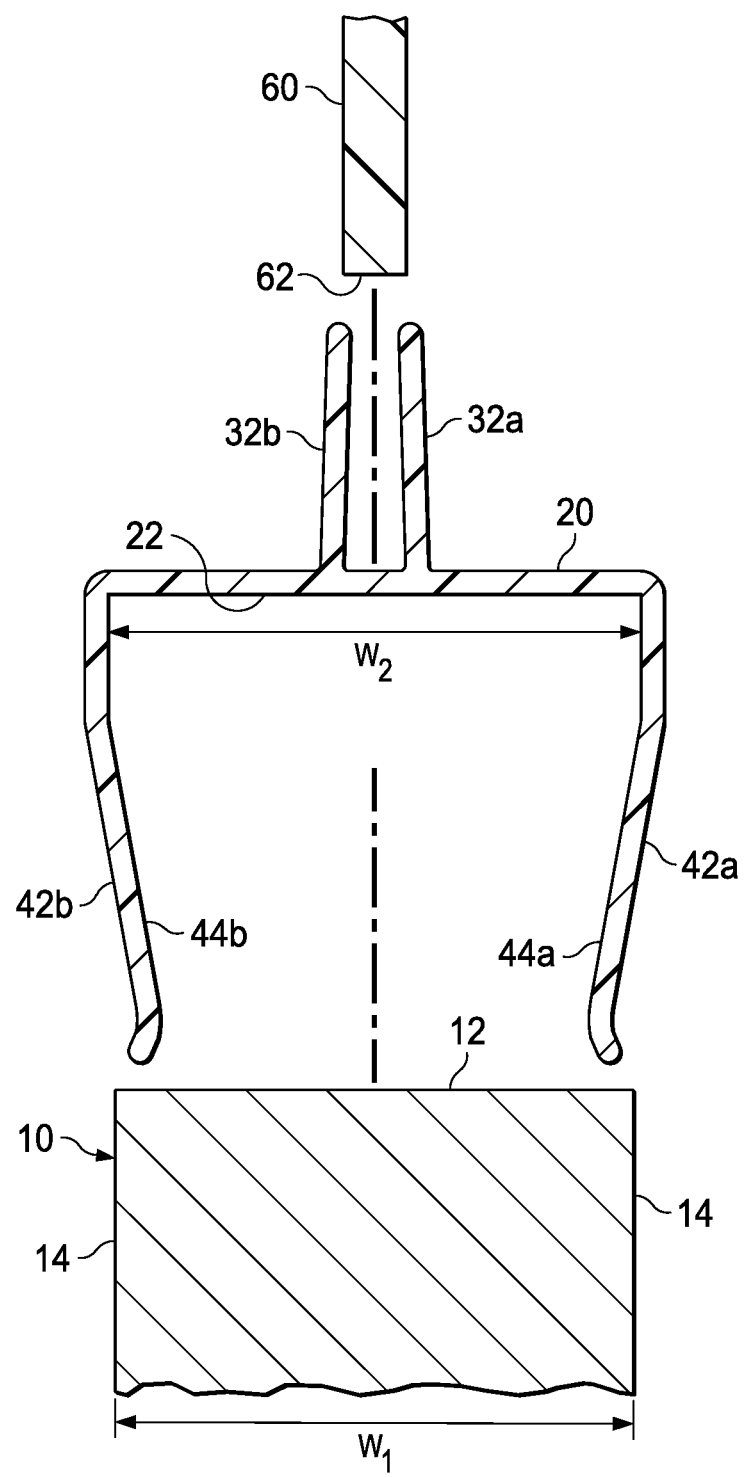
FIG. 3 is a cross-sectional view of the top cap overlay of the present invention configured above the top of a cubicle wall panel and having a vertical extension panel configured above the top groove.

While a top cap overlay 100 may be constructed so that the cross-section of the lower channel 40 is an exact match to the outer profile of a particular existing cubicle wall 10, the invention contemplates embodiments that may be used with a wide variety of differing profiles and manufacturers of existing cubicle walls. Thus, in one embodiment, the two opposing walls 42a, 42b may be substantially perpendicular to the horizontal panel 20. In another embodiment, the two opposing walls 42a, 42b may include portions 44a, 44b that are angled towards the center of the horizontal panel 20 in order to provide a biasing element against the sides of the existing cubicle wall. In yet another embodiment, the two opposing walls 42a, 42b may include portions 43a, 43b that are substantially perpendicular to the horizontal panel 20 and portions 44a, 44b that are angled towards the center of the horizontal panel 20 in order to provide a biasing element against the sides of the existing cubicle wall 10 (FIG. 3). It is understood that the height and thickness of the two opposing walls 42a, 42b of the lower channel 40 may vary depending on the strength and flexibility of the materials used to construct the top cap overlay 100.

The underside surface 22 of the horizontal panel 20 (FIG. 2B) may also include an abraded surface to prevent the movement of the top cap overlay 100 along the top surface 12 of the cubicle panel 10. Alternatively, two-sided adhesive tape may be applied to the underside surface 22 of the horizontal panel 20 to further bond the top cap overlay 100 to the top 12 of an existing cubicle wall 10.

Figure 4:
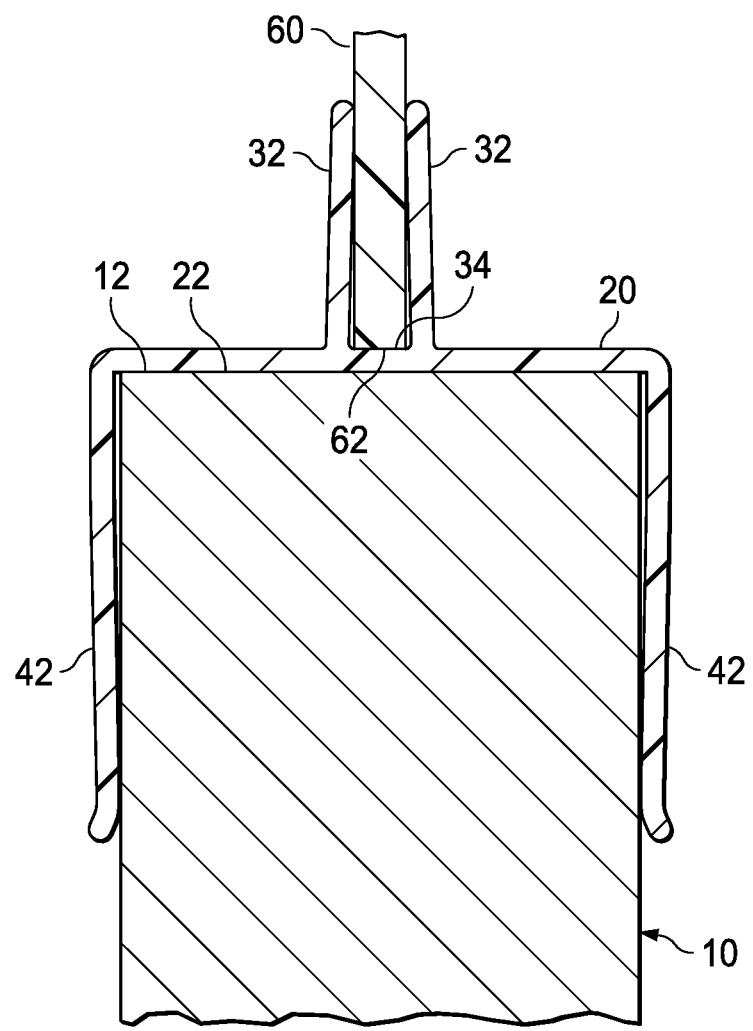
FIG. 4 is a cross-sectional view of the top cap overlay of the present invention seated on top of a cubicle wall panel and having a vertical extension panel seated in the top groove.

As shown in FIGS. 3 and 4, the cross-sectional width $W_2$ of the underside surface 22 of the horizontal panel 20 is typically dimensioned so as to be at least as wide as the width $W_1$ of the top of the existing cubical wall 20, but preferably slightly wider so that the underside surface 22 of the horizontal panel 20 lies flat against the top surface 12 of the existing cubical wall 10. While the top 12 of the existing cubical wall 10 is often times flat, in some cases the top of the existing cubical wall 10 may have a concave or convex cross-section. In such instances, the top cap overlay 100 may be designed to further comprise a horizontal panel 20 having a cross-section that is complementary to the shape of the concave or convex cross-section of the existing cubical wall 10.

The top cap overlay 100 also includes at least one upper channel or groove 30 extending from the top of the horizontal panel 20 along the entire length of the top cap overlay 100 for receiving a length of vertically-configured extension panel 60. The upper channel or groove 30 comprises at least two walls 32a, 32b extending from the top of the horizontal panel 20 and spaced sufficiently apart to receive and hold the edge of the vertical extension panel 60. The at least two walls 32a, 32b forming the upper channel or groove 30 may be angled towards each other to provide a bias against the sides of the vertical extension panel 60. The height of the at least two walls 32a. 32b is designed to seal against and hold the vertical extension panel 60 snuggly and securely along its entire length. The interior surfaces 35a. 35b of the at least two walls 32a, 32b may be abraded to further restrict the movement of the vertical extension panel 60 within the upper channel or groove 30. It is understood that the height of the at least two walls 32a, 32b of the upper channel or groove 30 may vary depending on the strength and flexibility of the particular materials used to construct the top cap overlay 100.

The cross-sectional width of the bottom 34 of the at least one upper channel or groove 30 is typically dimensioned so as to be at least as wide as the thickness or width of the vertical extension panel 60, but preferably slightly wider so that the edge 62 of the vertical extension panel 60 lies flat and secure within the least one upper channel or groove 30.

While the vertical extension panel 60 may comprise any material of suitable strength and rigidity, preferably the vertical extension panel 60 may comprise an acrylic or polycarbonate sheet. The design of a particular upper channel or groove 30 may be dimensioned to fit a range of widths. While the use of thinner and thicker materials is possible, with regard to conventional acrylic and polycarbonate sheet and the like, the invention preferably uses vertical extension panels having a nominal thickness ranging from ⅛" (3 mm) to ½" (12 mm). In addition, the vertical extension panel may be clear, translucent, colored, opaque or textured.

While FIG. 2B depicts the cross-section of the top cap overlay 100 having a uniform thickness, it is understood that the cross-sectional thickness of the horizontal panel 20, lower channel walls 42, and upper channel walls 32 may vary in thickness and size from each other in accordance with the strength and flexibility requirements of constituent parts of the top cap overlay 100. In addition, while FIG. 2A depicts the top cap overlay 100 as being open on its end, it is understood that in one embodiment the top cap overlay 100 may feature a cross-sectional cap (not pictured) on one end for use on an unsupported end wall of an existing cubicle wall. The cross-sectional cap may be planar or molded with an aesthetic shape.

Figure 5A:
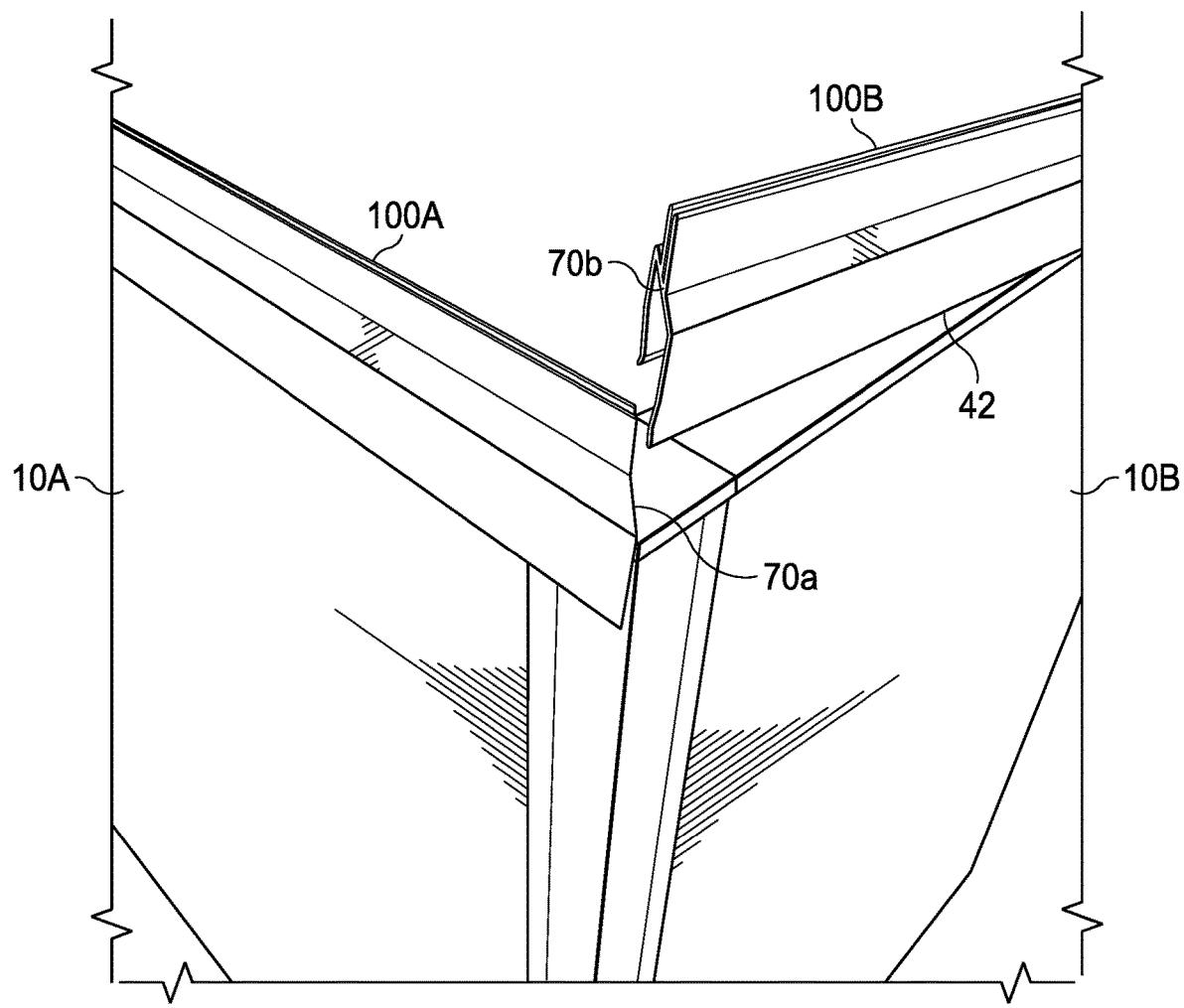
FIG. 5A-C depicts the installation of the cubicle wall extension system of the present invention onto an outer corner of a cubicle office wall system.
Figure 5B:
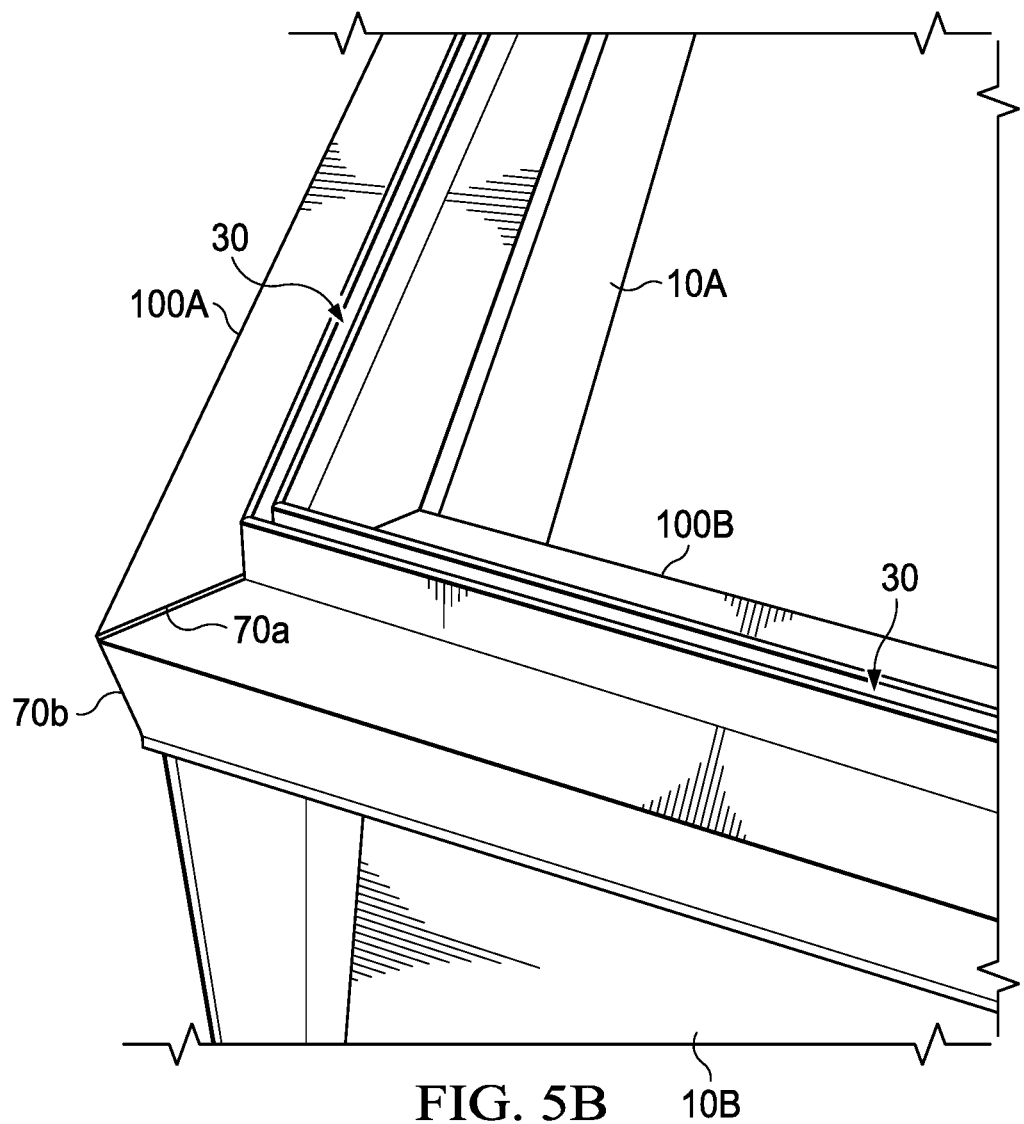
Figure 5C:
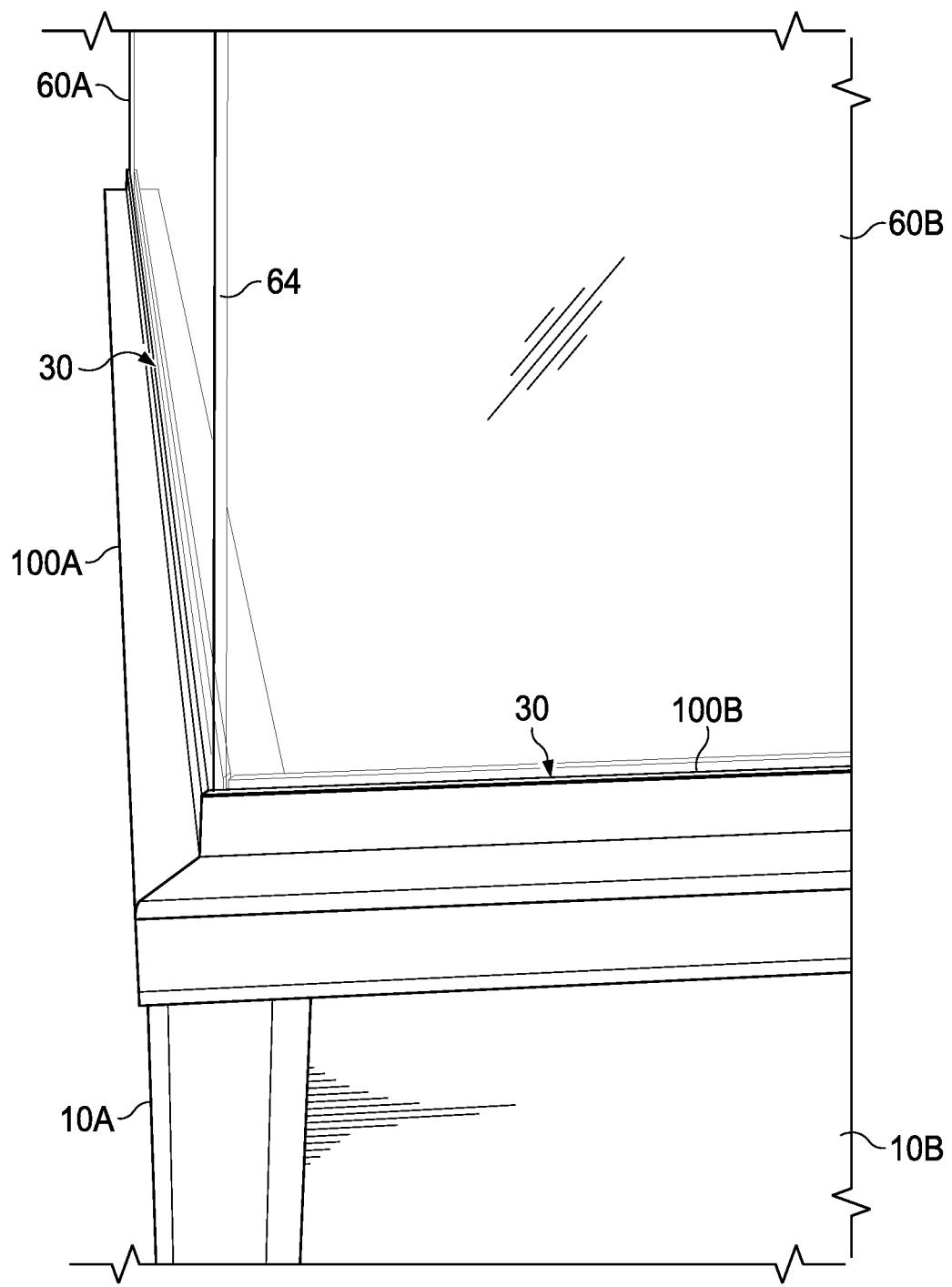

The top cap overlay is easily machined and installed with conventional tooling further enhancing the ease of installation and quality of the finished extension wall. For example, as shown in FIGS. 5A-5C an installation of the cubicle wall extension system of the present invention onto an outer corner of an existing cubicle office wall system is depicted.

Two lengths of top cap overlay 100A 100B are cut (e.g., with a conventional miter saw) at 45° angles on their opposing ends 70a, 70b. The lower channels 40 of the two lengths of top cap overlay 100A, 100B may be slipped on or fitted over the top of their respective existing cubicle office wall 10A, 10B so as to form a neat and finished 90° corner on the existing cubicle office wall system. Moreover, the at least one upper channel or groove 30 on each of the top cap overlays 100A, 100B are also aligned. Thus, a length of vertical extension panel 60 may be inserted into its respective channel or groove 30 to complete the height extension system. The joint 64 between the joining edges of the two vertical extension panels 60A, 60B may be reinforced with an adhesive (e.g., silicone sealant) or adhesive tape.

With reference now to FIGS. 6A-6D, an installation of the subject invention on an existing cubicle wall system comprising a main cubicle wall panel having one or more secondary cubicle wall panels extending perpendicularly away from the main cubicle wall panel is depicted. The main cubicle wall panel may be comprised of one or more adjacent cubical panel walls 10A/10C serially connected in a straight connection. At least one secondary cubicle wall panel 10B is connected to the main cubicle wall panel in a perpendicular configuration. A first length of top cap overlay 100A is measured for the length of the main cubicle wall panel. A notch 80 is then cut in the side of the top cap overlay 100A corresponding with the position and profile of the at least one secondary cubical wall panel 10B. The first length of top cap overlay 100A is then slipped on or fitted over the top 12 of the main cubicle wall panel. A second length of top cap overlay 100B having a 90 end is then slipped on or fitted over the top 12 of the secondary cubicle wall panel 10B so that its 90° end abuts the notch 80 formed in the first length of top cap overlay 100A. A first length of vertical extension panel 60A may then be inserted into its respective upper channel or groove 30 in the first length of top cap overlay 100A completing the height extension system on the main cubicle wall panel. A separate vertical extension panel 60B may then be inserted into its respective upper channel or groove 30 on a second length of top cap overlay 100B. The separate vertical extension panel 60B may then be configured in its respective upper channel or groove so that an edge abuts the plane of the first length of vertical extension panel 60A. The joint 64 between the adjoining edge and plane of the two vertical extension panels 60A/6B may be reinforced with an adhesive (e.g., silicone sealant) or adhesive tape.

Figure 6A:
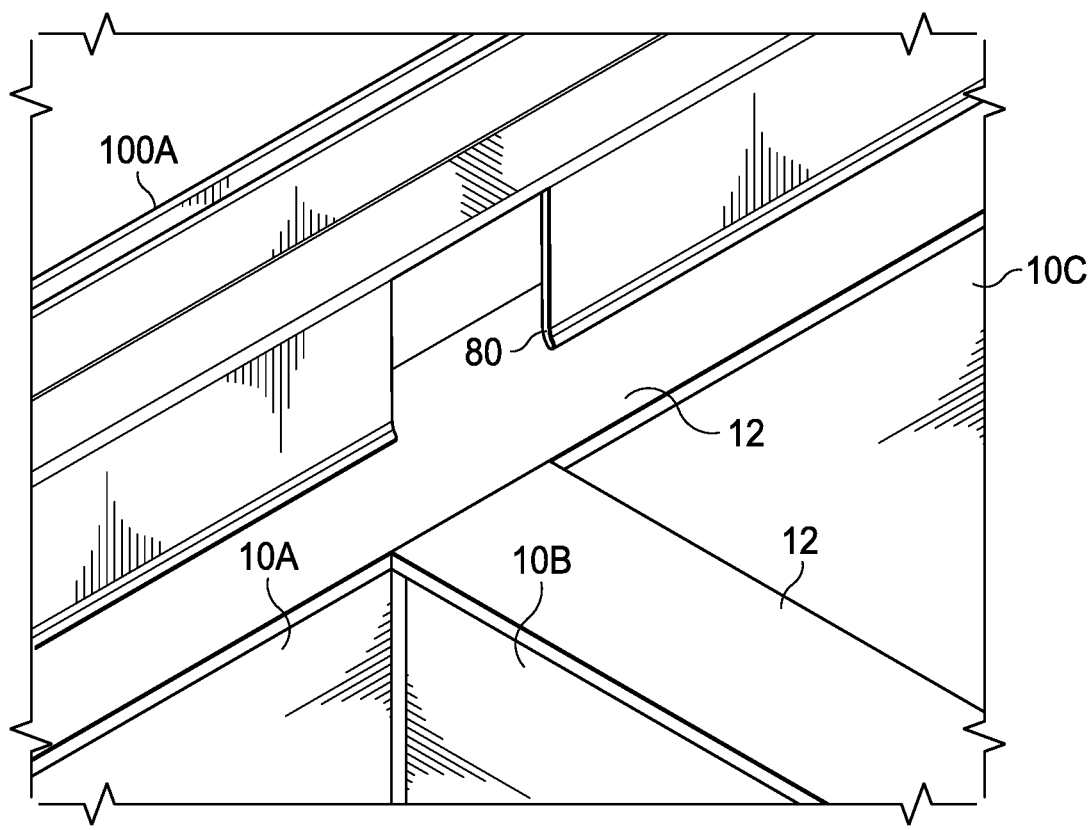
FIG. 6A depicts a length of a top cap overlay of the present invention configured with a side notch.
Figure 6B:
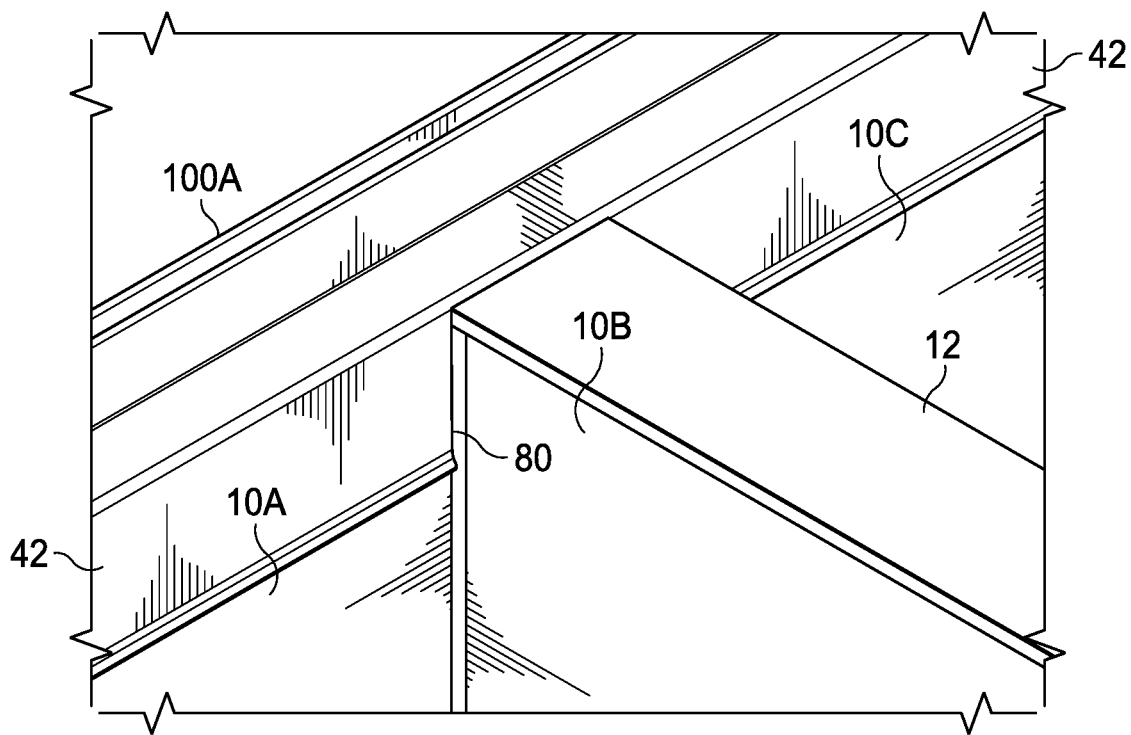
FIG. 6B depicts the length of top cap overlay shown in FIG. 6A properly configured on the top of a cubicle wall panel having a secondary cubicle wall panel extending perpendicularly away from the cubicle wall panel.
Figure 6C:
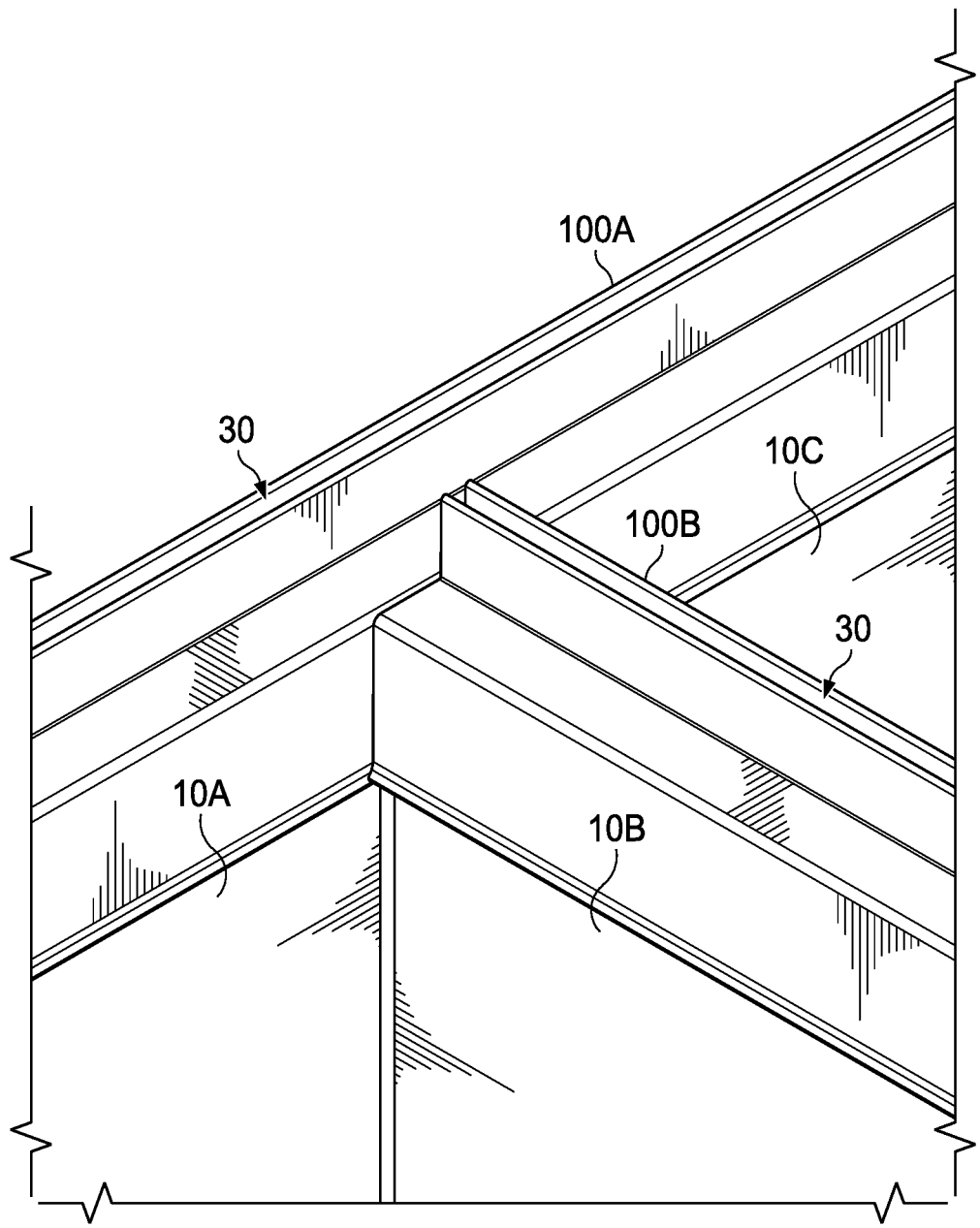
FIG. 6C is depicts a second length of top cap overlay properly configured onto the top of the secondary cubicle wall panel and having an edge abutting the length of top cap overlay on the cubicle wall panel.
Figure 6D:
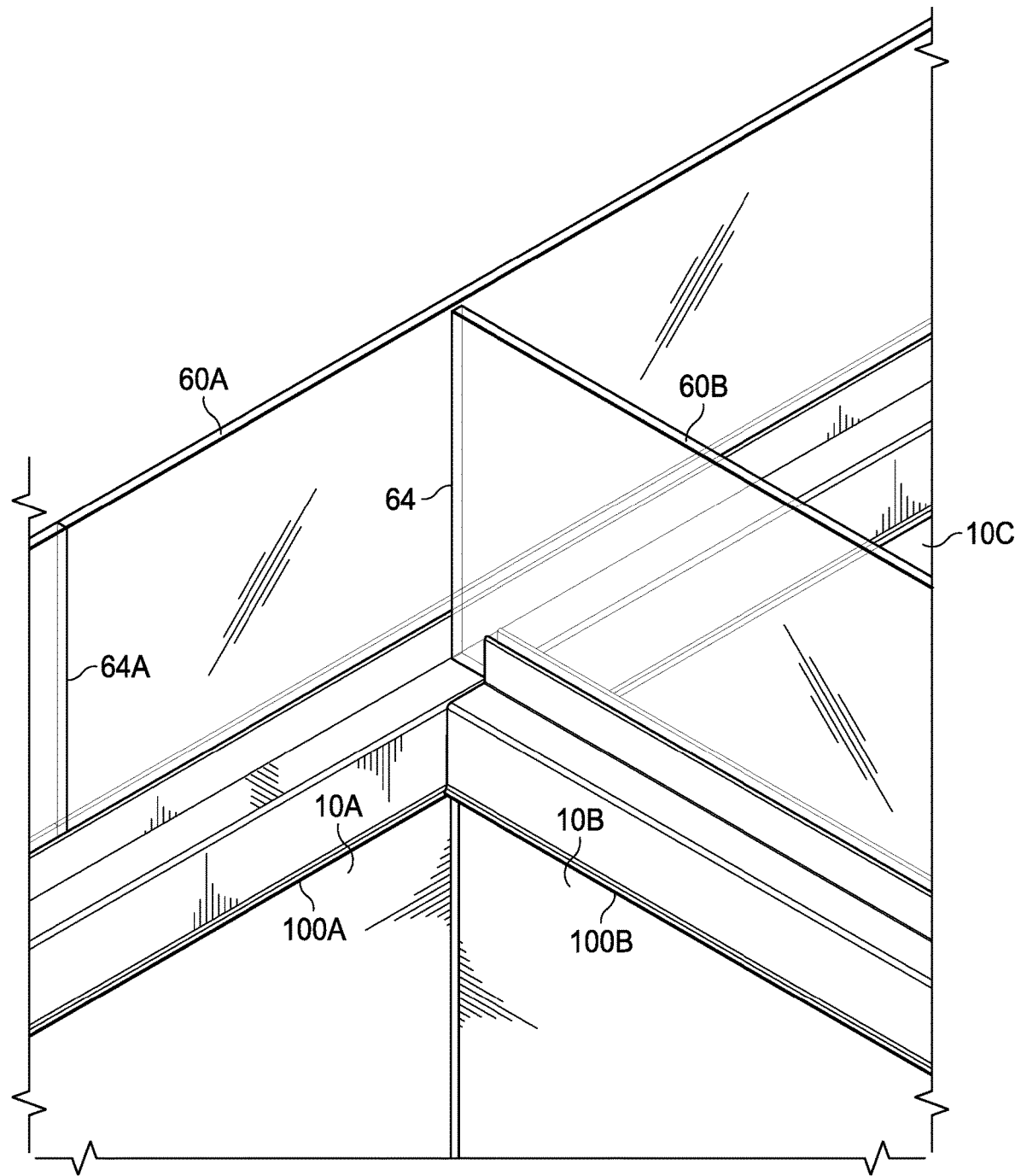
FIG. 6D illustrates the lengths of top cap overlay properly configured onto the cubicle wall panel and the secondary wall as depicted in FIG. 6C, and having a vertical extension panel seated in the top grooves of their respective top cap overlays.

FIG. 6D also shows an additional joint 64A between the first length of vertical extension panel 60A and a secondary length of vertical extension panel in serial configuration in the upper channel or groove 30 of the first length of top cap overlay 100A.

It will now be evident to those skilled in the art that there has been described herein an improved system for quickly and efficiently extending the height of cubicle wall panels, either permanently or temporarily. The seamless design of the present invention, which eliminates the horizontal gap between the top of a cubicle wall and the vertically-configured extension panel, significantly reduces the transmission of airborne droplets in a dense cubical environment.

Although the invention hereof has been described by way of a preferred embodiment, it will be evident that other adaptations and modifications can be employed without departing from the spirit and scope thereof. For example, while the vertical extension panels may include additional structural features to further prevent the transmission of airborne droplets. Moreover, dimensions of the top cap overlay may be adapted to fit free standing walls in need of extension but not part of a cubicle system. The terms and expressions employed herein have been used as terms of description and not of limitation; and thus, there is no intent of excluding equivalents, but on the contrary it is intended to cover any and all equivalents that may be employed without departing from the spirit and scope of the invention.

I claim:

1. A top cap overlay for extending the height of an existing cubicle wall, said top cap overlay comprising:
    a lower channel formed along the entire length of said top cap overlay, said lower channel adapted to be mounted to the top and sides of said existing cubicle wall, the lower channel comprising a horizontal panel having two walls extending from a bottom of said horizontal panel at opposing ends of said horizontal panel; and
    at least one upper channel formed along the entire length of said top cap overlay, said at least one upper channel comprising two walls extending from the top of said horizontal panel along the entire length of the top cap overlay, said at least one upper channel being adapted to receive an edge along substantially the entire length of a vertically-configured extension panel;
    wherein said top cap overlay has a length substantially equal to the length of the vertically-configured extension panel.

2. The top cap overlay of claim 1, wherein a cross-section of said top cap overlay is uniform and consistent along its length.

3. The top cap overlay of claim 1, wherein said walls of said lower channel include portions that are substantially perpendicular to the horizontal panel.

4. The top cap overlay of claim 1, wherein said walls of said lower channel include portions that are angled towards the center of said horizontal panel.

5. The top cap overlay of claim 1, wherein said walls of said lower channel include a first portion that is substantially perpendicular to the horizontal panel and a second portion that is angled towards the center of said horizontal panel.

6. The top cap overlay of claim 1, wherein the walls forming said at least one upper channel are angled towards each other to provide a bias against the sides of the vertically-configured extension panel.

7. The top cap overlay of claim 1, wherein said at least one upper channel comprises two upper channels.

8. The top cap overlay of claim 1, wherein said top cap overlay is constructed of an extruded thermoplastic material.

9. The top cap overlay of claim 8, wherein said extruded thermoplastic material is PVC.

10. The top cap overlay of claim 1, wherein the horizontal panel has a cross-section that is complementary to a cross-section of the existing cubicle wall.

11. The top cap overlay of claim 1, wherein an underside surface of the horizontal panel includes an abraded surface.

12. A system for extending the height of a cubicle wall, the cubicle wall having a top and sides, the system comprising:
    a vertically-configured extension panel having an edge along its length; and
    a length of top cap overlay substantially equal in length to the length of said vertically-configured extension panel, said length of top cap overlay comprising:
        a lower channel formed along the entire length of said top cap overlay, said lower channel adapted to be mounted to the top and sides of an existing cubicle wall, the lower channel comprising a horizontal panel having two walls extending from a bottom of said horizontal panel at opposing ends of said horizontal panel; and at least one upper channel formed along the entire length of said top cap overlay, said at least one upper channel comprising two walls extending from the top of said horizontal panel along the entire length of the top cap overlay, said at least one upper channel being adapted to receive the edge of substantially the entire length of the vertically-configured extension panel.

13. The device of claim 12, wherein a cross-section of said top cap overlay is uniform and consistent along its length.

14. The device of claim 12, wherein said vertically-configured extension panel comprises a sheet of acrylic material.

15. The device of claim 14, wherein said vertically-configured extension panel has a thickness ranging from 1/8" to 1/2".

16. The device of claim 12, wherein said vertically-configured extension panel comprises a sheet of polycarbonate material.

17. The device of claim 16, wherein said vertically-configured extension panel has a thickness ranging from 1/8" to 1/2".

18. The top cap overlay of claim 12, wherein the horizontal panel has a cross-section that is complementary to a cross-section of the existing cubicle wall.

19. The top cap overlay of claim 12, wherein an underside surface of the horizontal panel includes an abraded surface.

20. A method for extending the height of a cubicle wall, the cubicle wall have a top and sides, the method comprising:

providing a vertically-configured extension panel having an edge along its length;

providing a top cap overlay, said top cap overlay extending substantially along a length of the cubicle wall and comprising a lower channel formed along the entire length of said top cap overlay, said lower channel adapted to be mounted to the top and sides of an existing cubicle wall, the lower channel comprising a horizontal panel having two walls extending from a bottom of said horizontal panel at opposing ends of said horizontal panel; and at least one upper channel formed along the entire length of said top cap overlay, said at least one upper channel comprising two walls extending from the top of said horizontal panel along the entire length of the top cap overlay, said at least one upper channel being adapted to receive the edge of substantially the entire length of the vertically-configured extension panel, mounting said top cap overlay onto said top and sides of said existing cubicle wall; and mounting said length of vertically-configured extension panel onto said top cap overlay by placing the edge of substantially the entire length of said vertically-configured extension panel into said at least one upper channel.

* * * * *